(12) United States Patent
Yagi

(10) Patent No.: US 6,990,026 B2
(45) Date of Patent: Jan. 24, 2006

(54) DATA PROCESSING APPARATUS AND MEMORY CARD

(75) Inventor: Hideki Yagi, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 22 days.

(21) Appl. No.: 10/828,239

(22) Filed: Apr. 21, 2004

(65) Prior Publication Data
US 2004/0268074 A1     Dec. 30, 2004

(30) Foreign Application Priority Data
Apr. 24, 2003  (JP)  ............... 2003-120093

(51) Int. Cl.
*G11C 7/00* (2006.01)
(52) U.S. Cl. .................. 365/195; 365/185.04; 365/52; 365/63; 711/115; 711/164
(58) Field of Classification Search ................ 365/195, 365/52, 53; 711/115, 164
See application file for complete search history.

(56) References Cited

U.S. PATENT DOCUMENTS
5,361,228 A * 11/1994 Adachi et al. ......... 365/189.03

FOREIGN PATENT DOCUMENTS
JP          08-505964          6/1996

* cited by examiner

*Primary Examiner*—Son T. Dinh
*Assistant Examiner*—Pho M. Luu
(74) *Attorney, Agent, or Firm*—Finnegan, Henderson, Farabow, Garrett & Dunner, L.L.P.

(57) ABSTRACT

A CPU locks a memory card attached to a card mount with a password by a lock/unlock processing according to an access limit application program, and unlocks the lock based on a predetermined condition. The function to control the secrecy of data recorded on the card is thus improved.

8 Claims, 10 Drawing Sheets

DATA PROCESSING APPARATUS AND MEMORY CARD

CROSS-REFERENCE TO RELATED APPLICATIONS

This application is based upon and claims the benefit of priority from prior Japanese Patent Application No. 2003-120093, filed Apr. 24, 2003, the entire contents of which are incorporated herein by reference.

BACKGROUND OF THE INVENTION

1. Field of the Invention

The present invention relates to a data processing apparatus capable of dealing with a recording medium having a function of controlling secrecy of data and a memory.

2. Description of the Related Art

The security function to protect data has become more important for a memory card used as an input/output device for data processing apparatuses as the storage volume of a memory card has become bigger. An existing security function of this kind is conventionally the data protection function using a password (e.g., Jpn. Pat. Appln. KOHYO Publication No. 8-505964).

However, this data protection function based on a password achieves only a low access-limit level, and therefore cannot cope with high multimedia technologies.

BRIEF SUMMARY OF THE INVENTION

The present invention is directed to substantially obviate one or more of the problems due to limitations and disadvantages of the related art.

According to an embodiment of the present invention, a data processing apparatus comprises a mount to which a recording medium having a lock/unlock function is attached; a determination unit which determines whether the recording medium attached to the mount has the lock/unlock function; a locking unit which locks the recording medium to protect data recorded on the recording medium; and an unlocking unit which unlocks the recording medium locked by the locking unit based on a predetermined condition.

According to another embodiment of the present invention, a memory card having a lock/unlock function, comprises a locking unit which locks the memory card; an unlocking unit which unlocks the memory card locked by the locking unit; a memory which stores condition data on which locking or unlocking is performed; and a controller which limits access to recorded data in the memory card by the locking unit or the unlocking unit based on the condition data stored in the memory.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of a data processing apparatus according to the present invention will now be described with reference to the accompanying drawings.

Figure 1:
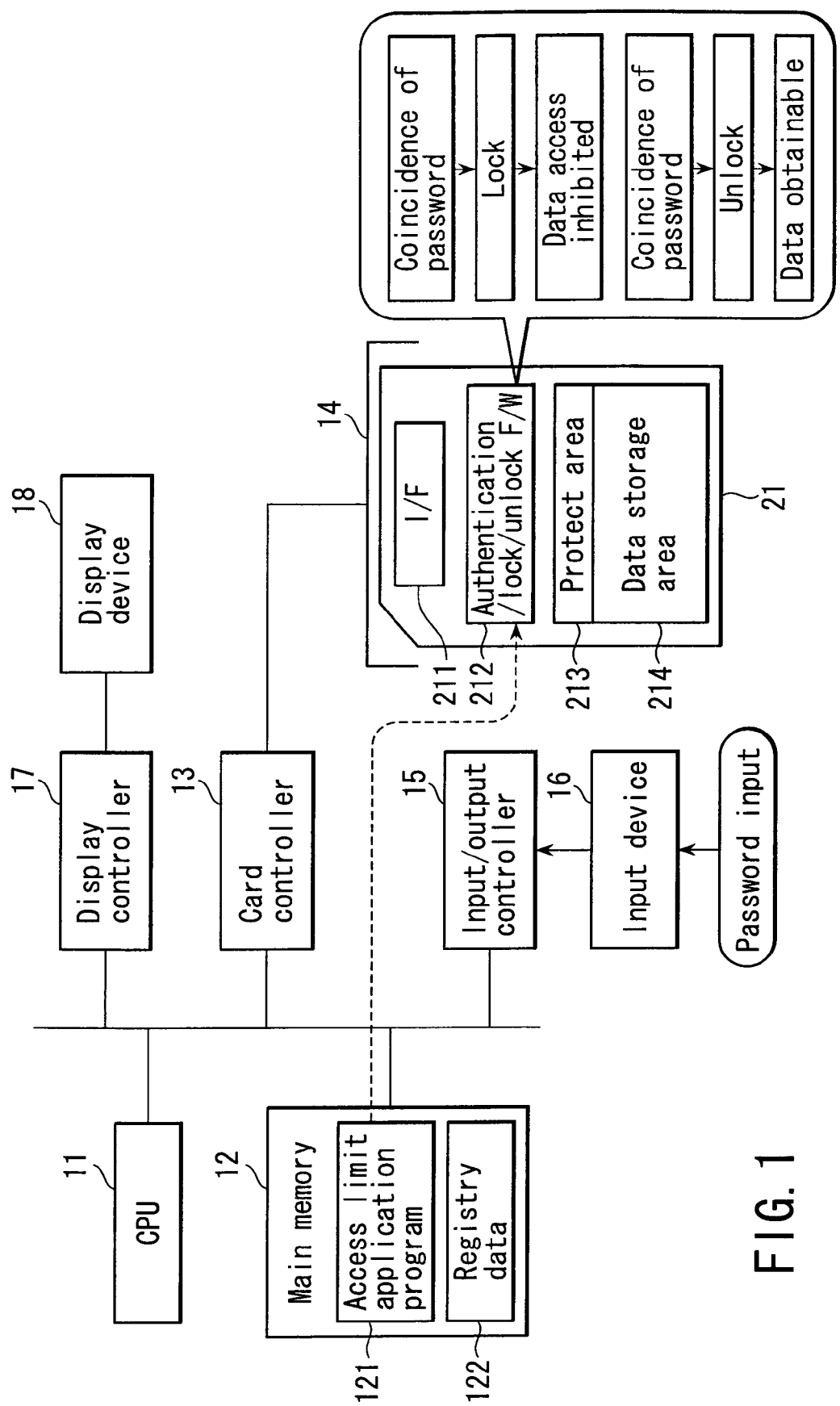
FIG. 1 is a block diagram showing the configuration of a main part of a first embodiment of the present invention.

FIG. 1 is a block diagram showing the configuration of a data processing apparatus in the embodiment of the present invention.

As shown in FIG. 1, the data processing apparatus according to the embodiment of the present invention comprises a CPU 11, a main memory 12, a card controller 13, a card mount 14, an input/output controller 15, an input device 16, a display controller 17, and a display device 18. The main memory 12 stores an access-limit application program 121 which realizes a data-secrecy control processing, including a lock/unlock function as shown in FIGS. 2 to 11. The main memory 12 comprises a registry 122 used for storing condition data and the like in the lock/unlock processing. A recording medium 21 having a data-secrecy-control function at a high access-limit level based on a data encryption processing, authentication processing, and the like is detachably attached to the card mount 14, and is thus attached to the apparatus main body. An SD (secure digital) memory card as the recording medium 21 is attached directly or via a card adapter to the apparatus main body.

The SD memory card 21 attached to the card mount 14 includes an interface (I/F) unit 211, an authentication/lock/unlock processing unit 212, a protected-data storage area (protected area) 213, and a normal-data storage area 214 which is not protected. The interface unit 211 includes a circuit which controls an interface to the host's side (the apparatus main body), and performs input/output control to access (read/write) data with respect to the apparatus main body. The authentication/lock/unlock processing unit 212 is realized by a microprocessor and firmware (F/W) to perform a predetermined authentication procedure and a lock/unlock processing. The protected area 213 is a data storage area which is accessible only when the authentication procedure is successful. The data storage area 214 is a data storage area which is accessible without involving the authentication procedure.

The CPU 11 controls the entire system including the units as described above. In this embodiment, the processing for controlling data secrecy, including a lock/unlock processing as shown in FIGS. 2 to 11 targeted on recording media, are executed according to the access limit application program 121 stored in the main memory 12. The main memory 12 provides a program storage area for storing various programs including the OS executed by the CPU 11, and a work area for various data processings. In the present embodiment, the access limit application program 121 performs a processing for controlling data secrecy, including the lock/unlock processing as shown in FIGS. 2 to 11 described later, and the registory 122 holds condition data and the like used for the lock/unlock processing.

The card controller 13 performs data writing/reading control in writing/reading data on/from the SD memory card 21 attached to the card mount 14 under control of the CPU 11. In this embodiment, input/output control in the lock/unlock processing as shown in the figures is carried out in corporation with the authentication/lock/unlock processing unit 212 in the SD memory card, in the processing of the access limit application program 121 executed by the CPU 11. The card mount 14 has a card slot through which the SD memory card 21 is inserted and pulled out directly or via a card adapter. The SD memory card 21 attached to the card slot is connected to the connector of the apparatus main body.

The input device 16 connected to the input/output controller 15 comprises, for example, a keyboard, a pointing device, or the like. In this embodiment, the input device 16 is used to input a password to lock/unlock the SD memory card 21.

Figure 2:
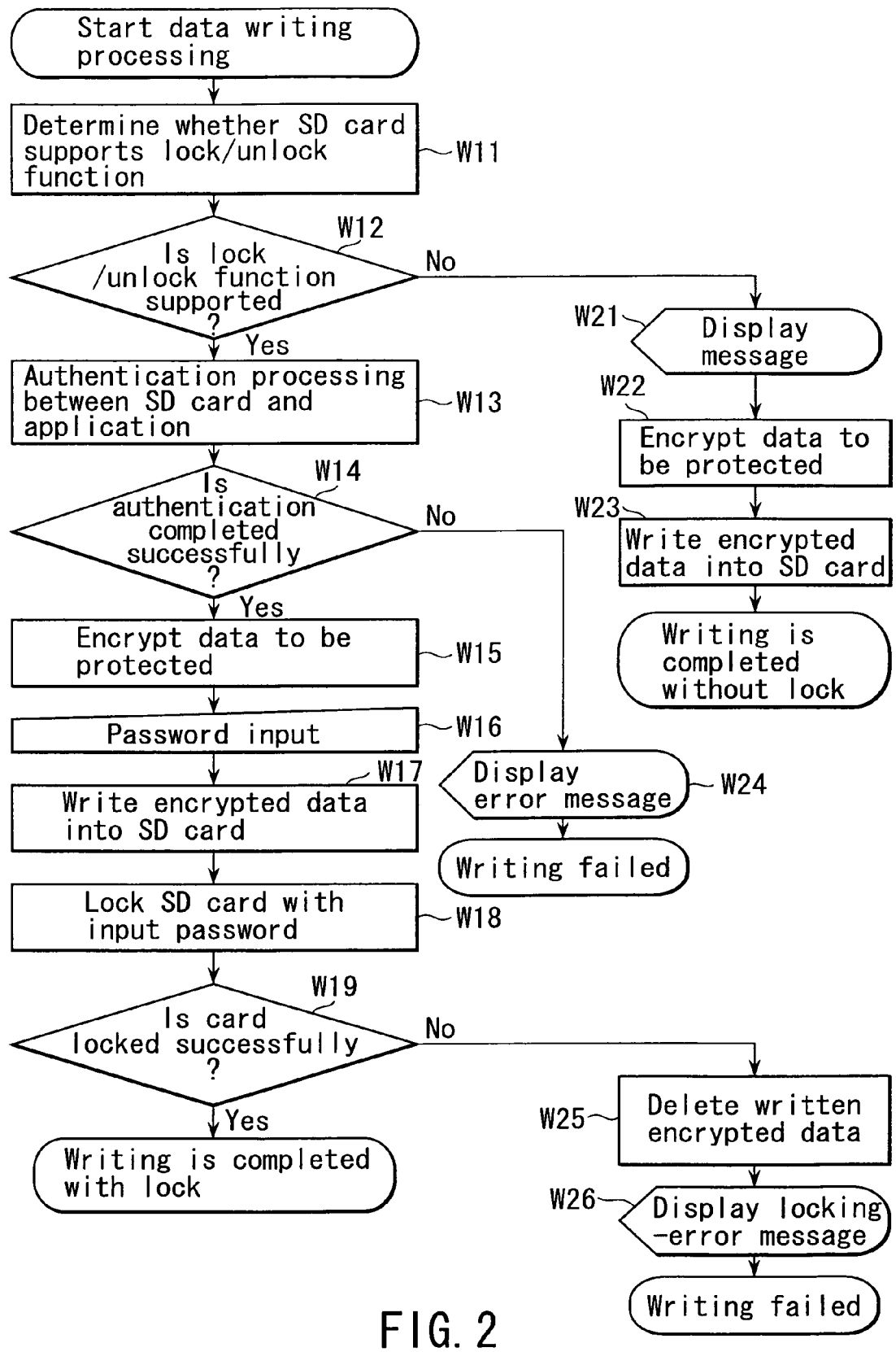
FIG. 2 is a flowchart showing the procedure of a data writing processing in the first embodiment.
Figure 3:
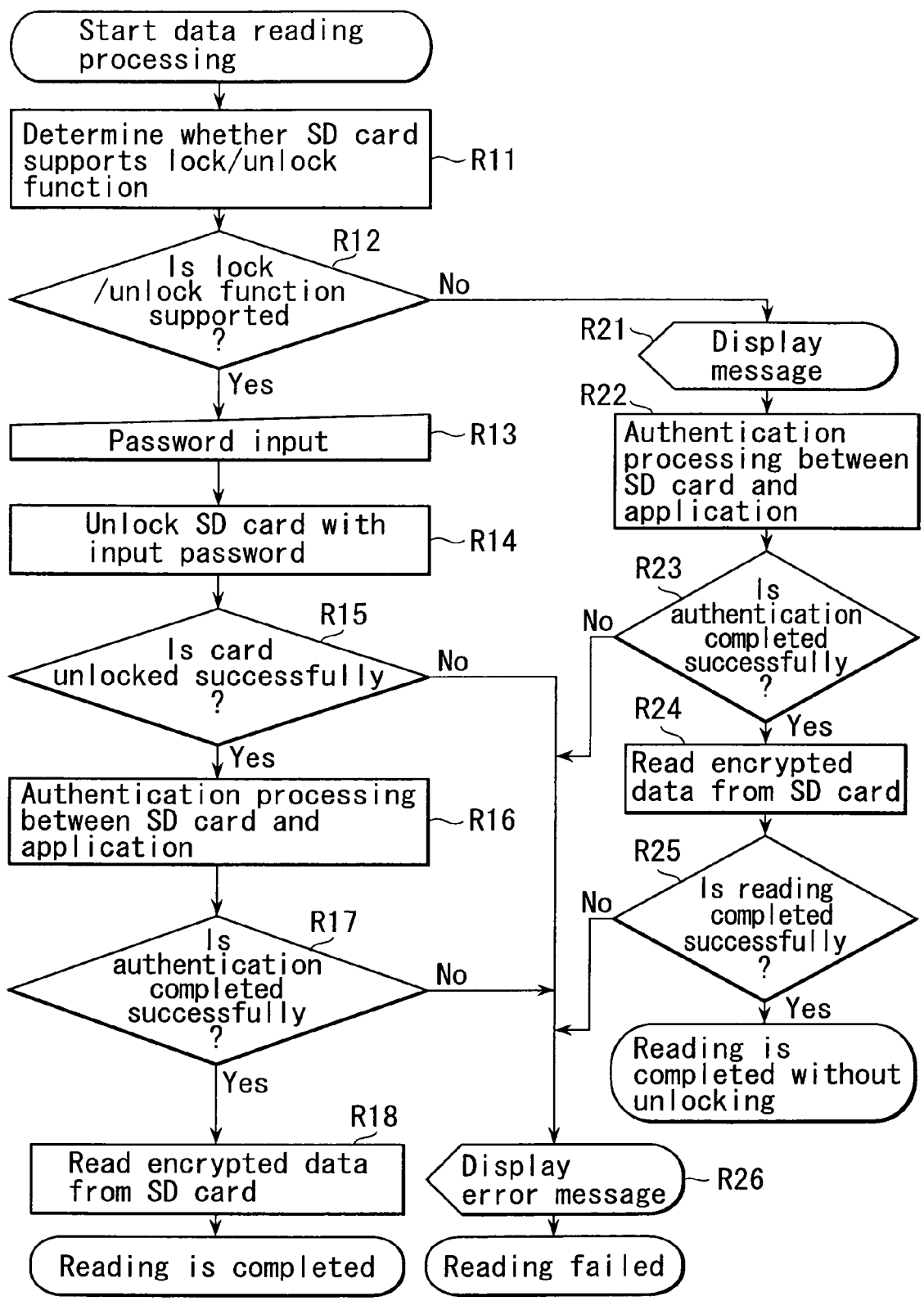
FIG. 3 is a flowchart showing the procedure of a data reading processing in the first embodiment.

FIG. 2 shows the outline of a data writing processing including a card lock function, in the entire system in the first embodiment. FIG. 3 shows the outline of a data reading processing including a card unlock function, also in the entire system in the first embodiment. FIGS. 2 and 3 each show a processing targeted on an SD memory card 21 having a protected area 213 which has already been set. If no protected area 213 is set in the SD memory card 21 attached to the card mount 14, the processing of an authentication procedure is omitted.

In the data writing processing of FIG. 2, it is determined whether the SD card 21 attached to the card mount 14 supports the lock/unlock function or not when data to be protected is written (step W11). If the SD memory card 21 does not support the lock/unlock function (No in step W12), a message indicating that writing is performed with no lock is displayed on the display device 18 (step W21). The data to be protected is encrypted (step W22) and written into the SD memory card 21 (step W23). The writing with no lock is the same as the data writing in an existing conventional SD memory card.

If the SD memory card 21 supports the lock/unlock function (Yes in step W12), presence of a protected area 213 is checked. Then, a predetermined authentication procedure is carried out between the authentication/lock/unlock processing unit 212 in the SD memory card 21 and the access limit application program 121 in the program area, which is executed by the CPU 11 (step W13).

If the authentication is not successful in the authentication procedure (No in step W14), an error message indicating a failure of writing is displayed on the display device 18, and the processing ends (step W24).

If the authentication is completed successfully (Yes in step W14), the data to be protected is encrypted (step W15). Input of a password is then suggested. When a password is input (step W16), the encrypted data is written into the SD memory card 21 (step W17).

After writing the encrypted data into the SD memory card 21, the SD memory card 21 is locked with the input password (step W18). If the lock is not successful (No in step W19), the data written into the SD memory card 21 is erased (step W25). A message indicating a failure of locking is displayed and the processing ends (step W26).

If the lock is completed successfully (Yes in step W19), the data writing with the lock with the password is finished. The password for the lock is recorded on the SD memory card 21. As a result, the function of protecting data recorded on the SD memory card 21 is improved much more. For example, this is because the card itself is locked even if a third party capable of decrypting the encrypted recorded data should obtain the SD memory card 21.

In the processing (FIG. 3) of reading data from the SD memory card 21 on which the data writing with a lock has been performed, it is determined whether the SD memory card 21 attached to the card mount 14 supports the lock/unlock function or not (step R11).

If the SD memory card 21 does not support the lock/unlock function (No in step R12), a message indicative of data reading without a lock is displayed on the display device 18 (step R21), and it is determined that a protected area 213 is present. Then, a predetermined authentication procedure is carried out between the authentication/lock/unlock processing unit 212 in the SD memory card 21 and the access limit application program 121 executed by the CPU 11 (step R22).

If the authentication is not successful in the authentication procedure (No in step R23), an error message indicating a failure of reading is displayed on the display device 18, and the processing ends (step R26). If the authentication is completed successfully (Yes in step R23), the encrypted data with no lock is read from the SD memory card 21 (step R24). Input of a password is then suggested. If the data cannot be read successfully (No in step R25), an error message indicating a failure of reading is displayed on the display device 18 and the processing ends (step R26). If the data is read successfully (Yes in step R25), the reading of data with no lock ends.

If the SD memory card 21 supports the lock/unlock function (Yes in step R12), input of a password for indicating an accessing person is then suggested. When a password is input (step R13), the validity of the input password is checked, and the SD memory card 21 is unlocked (step R14). To confirm the validity of the input password at this time, a password used for locking the card is read from a predetermined area of the SD memory card 21, and is compared with the input password.

If the unlocking is not successful (No in step R15), an error message indicating a failure of reading is displayed on the display device 18, and the processing ends (step R26). If the unlocking is completed successfully (Yes in step R15), presence of the protected area 213 is checked, and a predetermined authentication procedure is carried out between the authentication/lock/unlock processing unit 212 in the SD memory card 21 and the access limit application program 121 in the program area, which is executed by the CPU 11 (step R16).

If the authentication is not successful in the authentication procedure (No in step R17), an error message indicating a failure of reading is displayed on the display device 18, and the processing ends (step R26). If the authentication is completed successfully (Yes in step R17), the encrypted data with a lock is read from the SD memory card 21, and the processing ends (step R18).

Since the memory card has the lock/unlock function as described above, a higher-level multiple data protection is possible in addition to the authentication and the encryption even in a situation that encrypted data can be decrypted. The data-secrecy-control function is improved much more.

Other embodiments of the data processing apparatus according to the present invention will be described. The same portions as those of the first embodiment will be indicated in the same reference numerals and their detailed description will be omitted.

Figure 4:
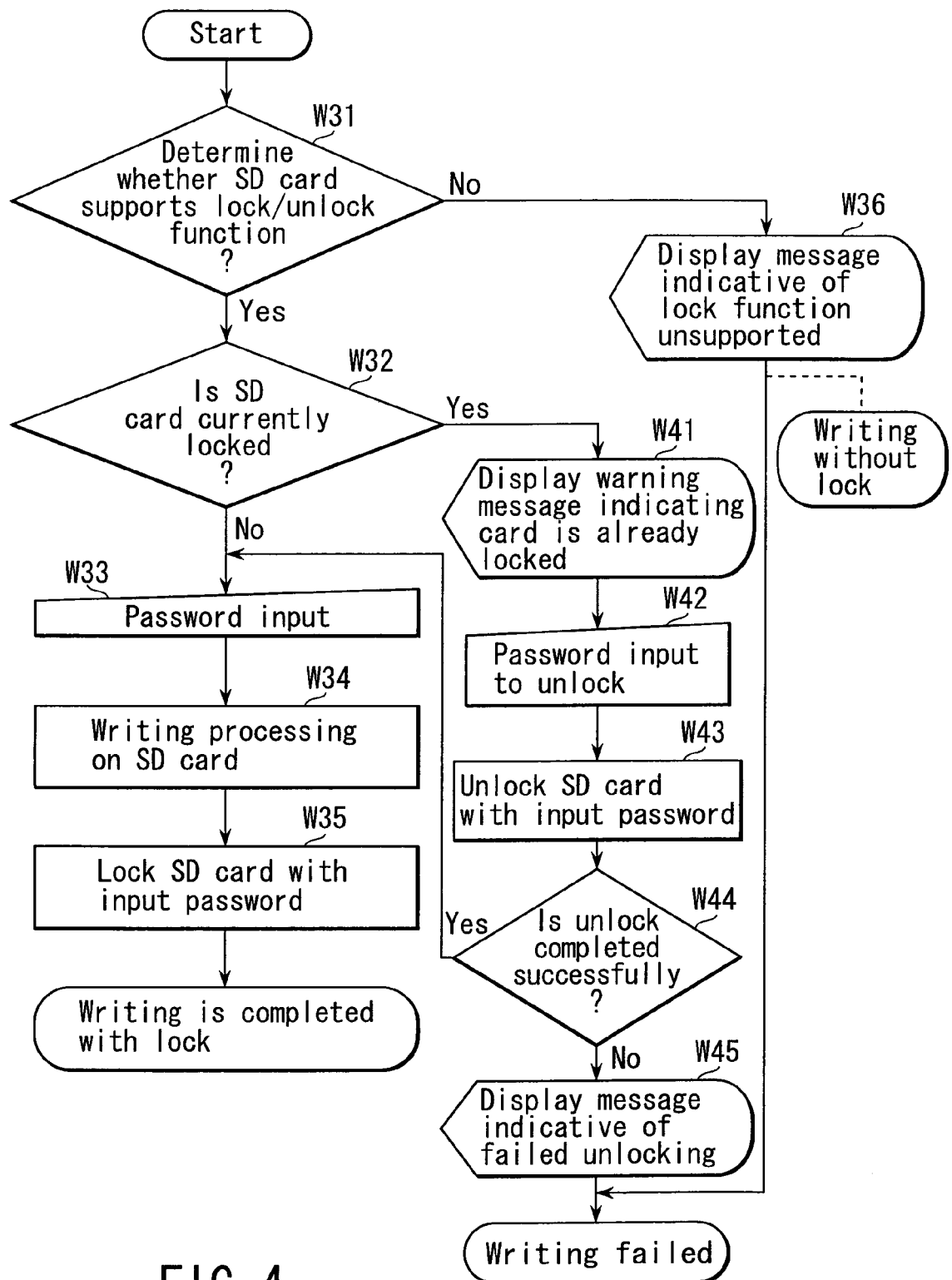
FIG. 4 is a flowchart showing the procedure of a data writing processing in a second embodiment of the present invention.
Figure 7:
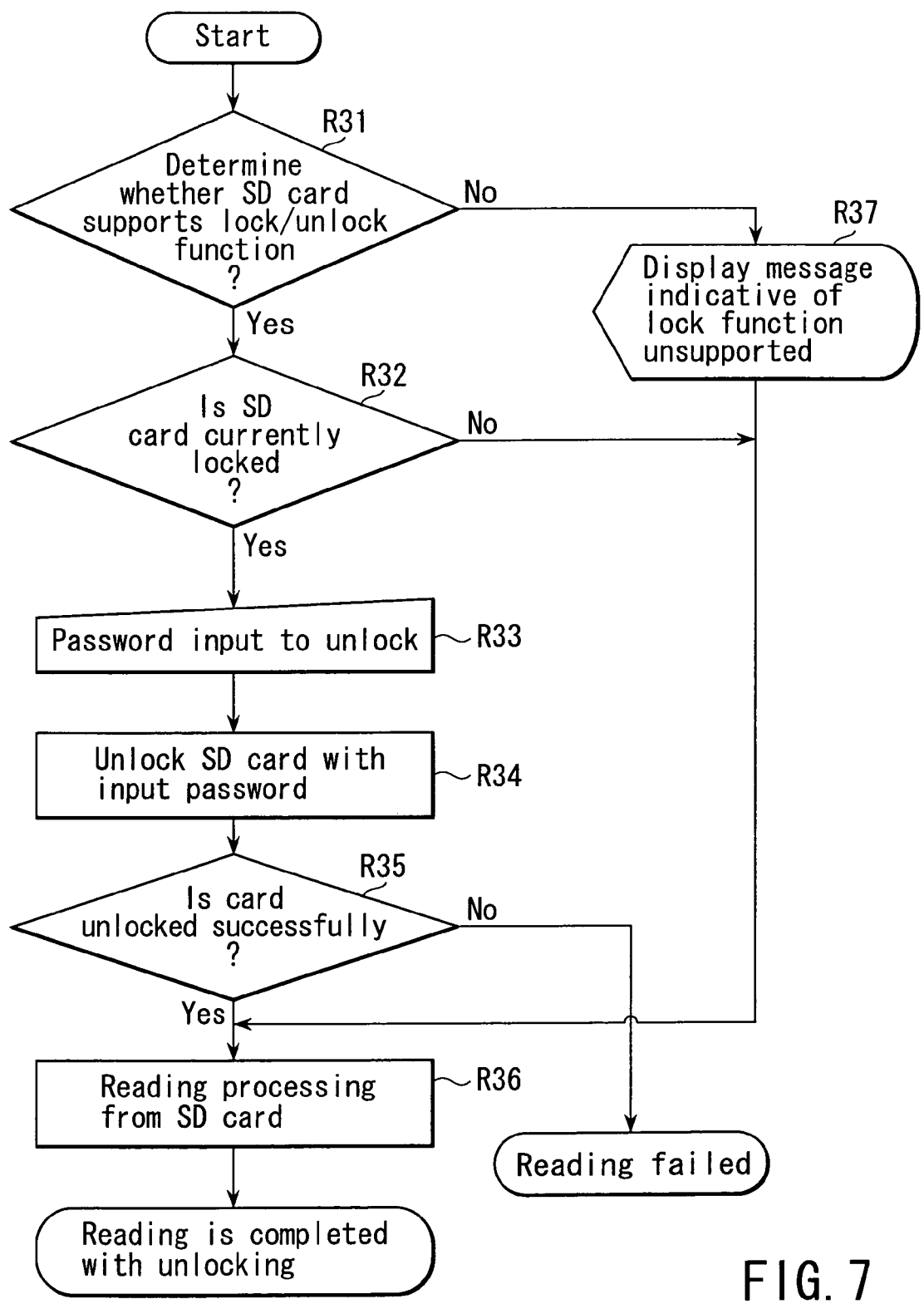
FIG. 7 is a flowchart showing the procedure of a data reading processing in the second embodiment.
Figure 8:
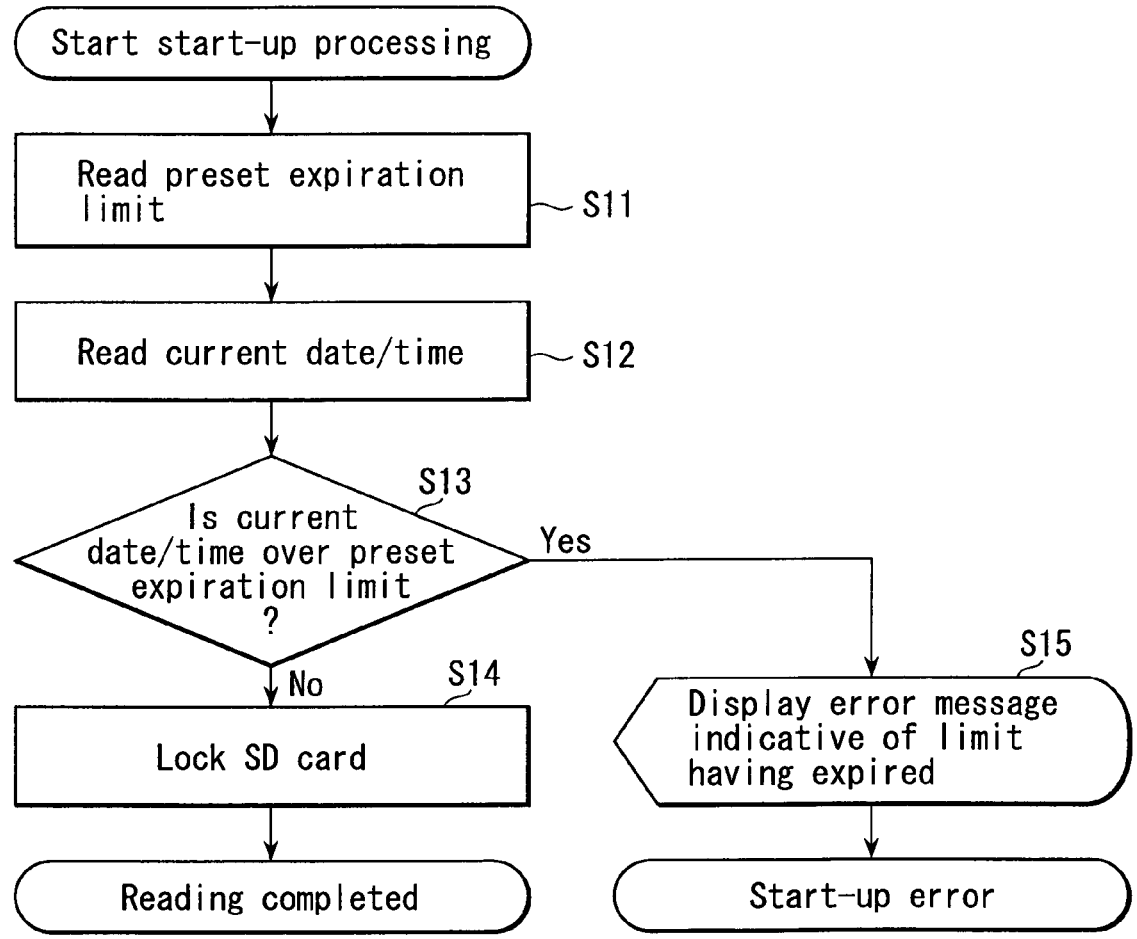
FIG. 8 is a flowchart showing the procedure of a start-up processing in a third embodiment of the present invention.

FIG. 4 shows a data writing processing of the access limit application program 121 according to a second embodiment. FIG. 7 shows a data reading processing thereof.

In the data writing processing of FIG. 4, it is determined whether the SD card 21 attached to the card mount 14 supports the lock/unlock function or not when data to be protected is written (step W31). If the SD memory card 21 does not support the lock/unlock function (No in step W31), a message indicating that cards supporting no lock/unlock function cannot be treated is displayed on the display device 18 (step W36), and the processing ends.

If the SD memory card 21 supports the lock/unlock function (Yes in step W31), it is subsequently determined whether the SD memory card 21 is locked or not (step W32).

If the SD memory card 21 is not locked (No in step W32), input of a password is suggested. When a password is then input (step W33), data is written into the SD memory card 21 (step W34). Further, the SD memory card 21 is locked with the input password, and the writing processing ends (step W35).

If the SD memory card 21 is locked (Yes in step W32), a message indicating that the memory card 21 is locked is displayed on the display device 18 (step W41), and further, input of a password is suggested. When a password is then input (step W42), the validity of the input password is checked, and unlocking of the SD memory card 21 is suggested (step W43).

If the unlocking is not successful (No in step W44), an error message indicating a failure of unlocking is displayed on the display device 18, and the processing ends (step W45).

If the unlocking is completed successfully (Yes in step W44), input of a password is suggested. When a password is then input (step W33), data is written into the SD memory card 21 (step W34), and the SD memory card 21 is locked with the input password. Then, the processing ends (step W35).

Figure 5:
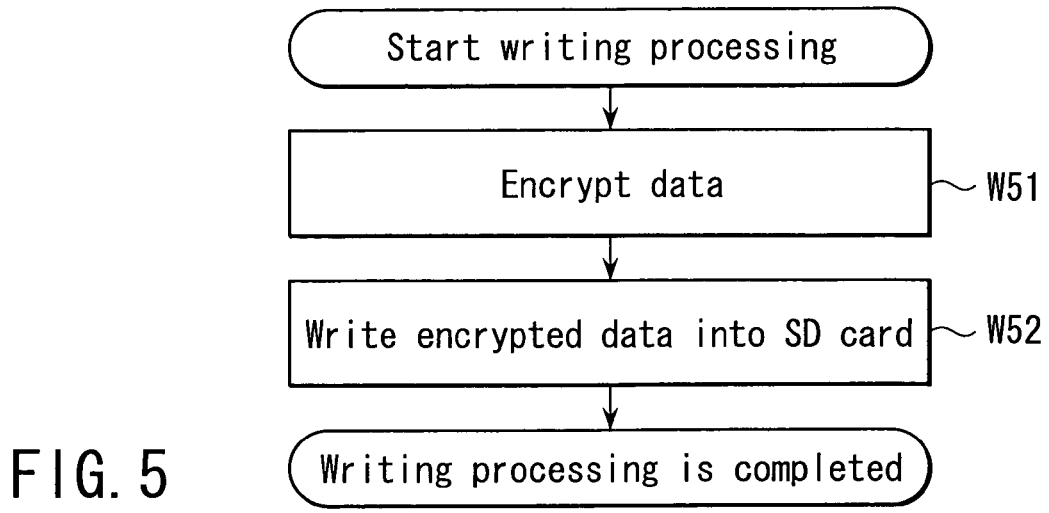
FIG. 5 is a flowchart showing the procedure of one example of a data writing processing in the second embodiment.
Figure 6:
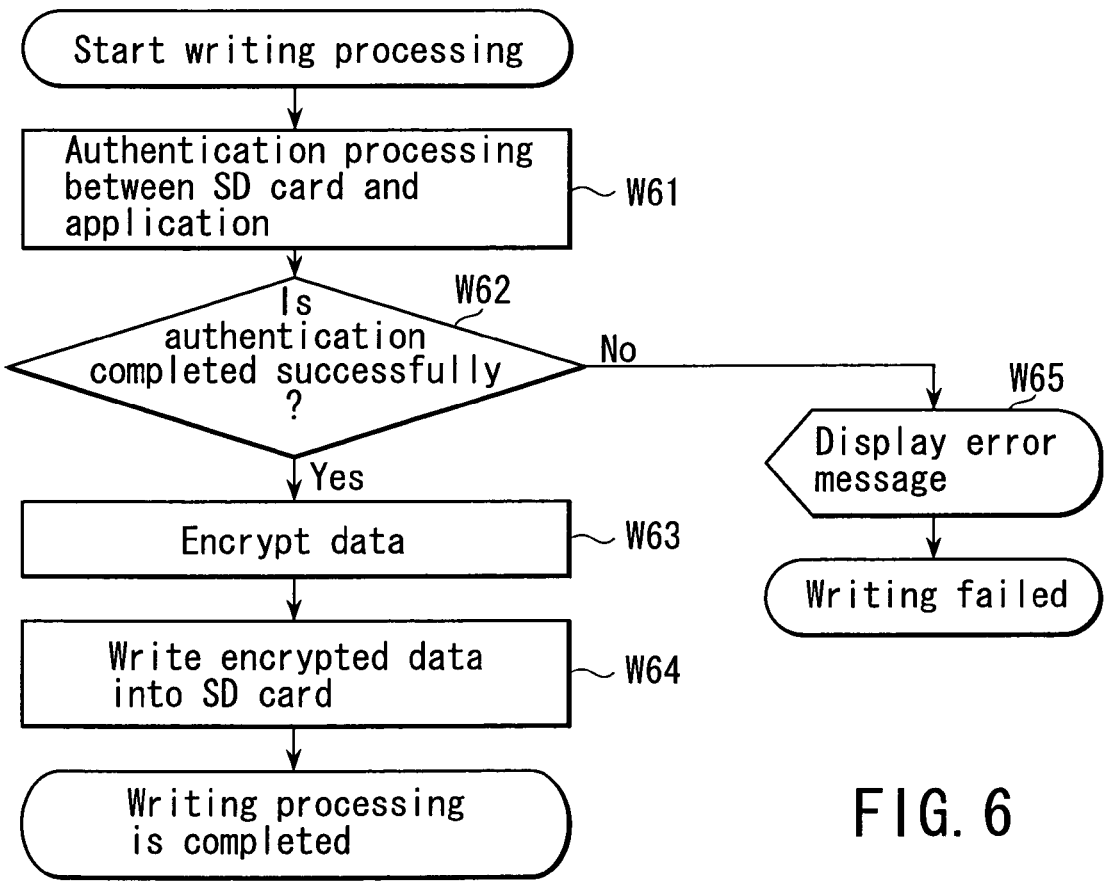
FIG. 6 is a flowchart showing the procedure of another example of a data writing processing in the second embodiment.

In the above described data writing processing into the SD memory card 21 (step W34), data is actually written into the SD memory card 21. The processings differ depending on whether the data is written into the normal data storage area 214 or the protected area 213. FIG. 5 shows the processing of writing data into the normal data storage area 214 at this time. FIG. 6 shows the other processing of writing data into the protected area 213.

In case of writing data into normal data storage area 214 as shown in FIG. 5, the data to be written is encrypted (step W51). The encrypted data is written into the data storage area 214 in the SD memory card 21, and the processing ends (step W52).

In the processing (FIG. 6) of writing data into the protected area 213, a predetermined authentication procedure is carried out with the authentication/lock/unlock processing unit 212 in the SD memory card 21 (step W61). If the authentication is not successful (No in step W62), an error message indicating a failure of writing is displayed on the display device 18, and the processing ends (step W65).

If the authentication is completed successfully (Yes in step W62), the data to be protected is encrypted (step W63), and the encrypted data is written into the protected area 213 in the SD memory card 21 (step W64).

In the data reading processing of FIG. 7, it is determined whether the SD memory card 21 attached to the card mount 14 supports the lock/unlock function or not (step R31). If the SD memory card 21 does not support the lock/unlock function (No in step R31), a message indicating that the memory card 21 does not support the lock/unlock function is displayed on the display device 18 (step R37). Then, the reading processing is performed on the SD memory card 21 (step R36), and the processing ends.

If the SD memory card 21 supports the lock/unlock function (Yes in step R31), it is determined whether the SD memory card 21 is locked or not (step R32).

If the SD memory card 21 is not locked (No in step R32), the reading processing is executed on the SD memory card 21 (step R36), and the processing ends.

If the SD memory card 21 is locked (Yes in step R32), input of a password for releasing the lock is then suggested. When a password is input (step R33), the SD memory card 21 is unlocked with the key (step R34).

If the unlocking is not successful (No in step R35), an error message indicating a failure of unlocking is displayed on the display device 18, and the processing ends (step R36).

In the above-described data reading processing from the SD memory card 21 (step R36), the processing of reading data from the normal data storage area 214 and the processing of reading data from the protected area 213 are different from each other like in the data writing processing. An authentication procedure is performed in the data reading processing from the protected area 213, like in the case of the writing processing to the protected area 213 described previously.

Thus, once the SD memory card 21 is locked, data cannot be read from the SD memory card 21 before the SD memory card 21 is unlocked with the same password used to lock the card. As a result, the secrecy of data recorded on the SD memory card 21 is improved much more.

In the second embodiment described above, if the SD memory card 21 does not support the lock/unlock function in the wiring processing into the SD memory card 21 (No in step W31), a message indicating that cards which do not support the lock/unlock function cannot be handled is displayed on the display device 18 (step W36), and the writing processing ends. However, as indicated by broken lines in FIG. 4, data writing with no lock may be enabled like in the first embodiment described previously.

Described next will be a third embodiment which realizes a much higher data-secrecy-control function, using the lock/unlock function described above. In the third embodiment, a password is obtained through a predetermined procedure with respect to data recorded on the SD memory card 21. With use of the password, the data recorded on the SD memory card 21 can be used for a predetermined limited period. The third embodiment will now be described with reference to FIGS. 1, 7, and 8.

In the third embodiment, data indicative of a preset control-expiration limit (step S11 in FIG. 8) is obtained as the access limit application program 121 starts up. Further, data indicative of the current date/time is obtained (step S12). Both of these data items are compared with each other to determine whether the current date/time is over the preset control-expiration limit or not (step S13). The data indicative of the control-expiration limit is encrypted and set in advance, for example, in the registry 122 of the main memory 12. This data is read from the registry 122 at the time of start-up, and is obtained by performing a decryption processing. The current date/time data is obtained from a clock module (RTC) operating in the apparatus main body via the OS (Operating System).

If the current date/time is after the preset control-expiration limit, i.e., over the control-expiration limit (No in step S13), an error message indicating that the expiration limit is over is displayed on the display device 18 (step S15). The access limit application program 121 is taken as causing a start-up error, and the access to the SD memory card 21 is made invalid.

If the current date/time is not after the preset control-expiration limit, i.e., within the control-expiration limit (Yes in step S13), the SD memory card 21 is locked (step S14), and the processing is continued.

With respect to the locked SD memory card 21, data recorded on the SD memory card 21 can be used by unlocking the SD memory card 21 with a password (see steps R33 to R36 in FIG. 7).

By using this function, various data services such as a trial listening to music, a preview of a film, a demonstration of a game, and the like can be provided maintaining high secrecy with their trial periods limited. In this case, much higher data protection is possible if data of the expiration limit of an allowable trial use is encrypted and stored in the protected area 213 in the SD memory card 21.

Described next will be a fourth embodiment of the present invention, which uses the lock/unlock function described above. In the fourth embodiment, a password is obtained through a predetermined procedure with respect to data recorded on the SD memory card 21. With use of the password, the data recorded on the SD memory card 21 can be used up to a predetermined preset number of times. The fourth embodiment will be described with reference to FIGS. 1, 7, and 9.

Figure 9:
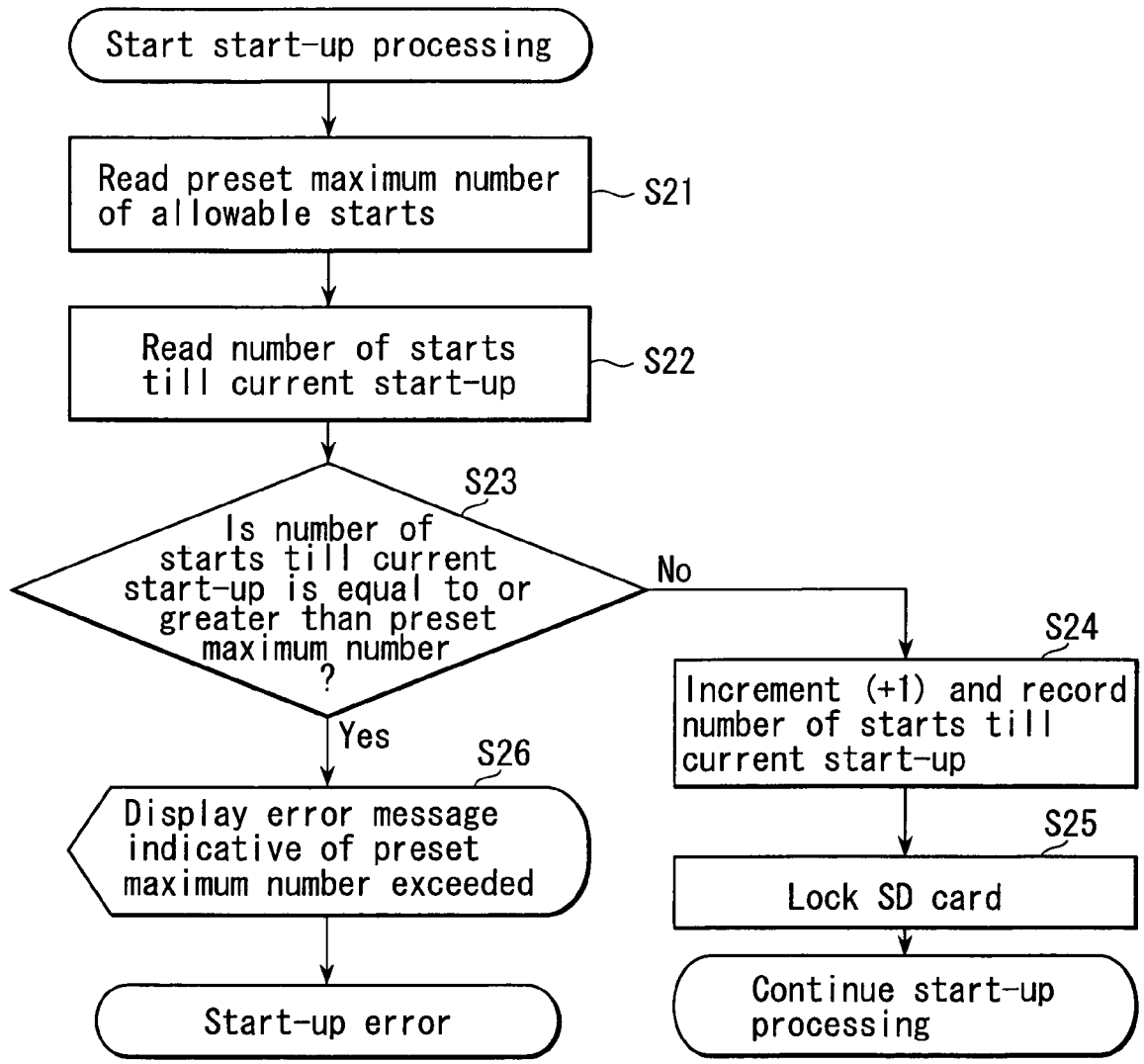
FIG. 9 is a flowchart showing the procedure of a start-up processing in a fourth embodiment of the present invention.

In the fourth embodiment, data indicative of a preset maximum number of starts the program can be started up is obtained as the access limit application program 121 starts up (step S21 in FIG. 9). Further, data indicative of another number of starts, i.e., how many times the program 121 has been started up till the current start-up is obtained (step S22). Both of these data items are compared with each other to determine whether the number of starts the program 121 has been started up till the current start-up exceeds the preset maximum number of starts or not (step S23). The data indicative of the maximum number of starts is encrypted and set in advance, for example, in the registry 122 of the main memory 12. This data is read from the registry 122 at the time of start-up, and is obtained by performing a decryption processing. The other data indicative of the number of times the program 121 has been started up till the current start-up can be obtained, for example, by using a particular area of the registry 122 as a start number counter and by incrementing the content of the counter for every start-up of the application. The contents (count value) i.e., of the number of starts may be encrypted and held in the start number counter.

If the number of starts till the current start-up exceeds the preset maximum number of starts (Yes in step S23), an error message thereof is displayed on the display device 18 (step S26). Then, the access limit application program 121 is taken as causing a start-up error, and the access to the SD memory card 21 is made invalid.

If the number of starts till the current start-up does not exceed the preset maximum number of starts (No in step S23), the number of start till the current start-up is updated (+1) (step S24). Then, the SD memory card 21 is locked (step S25), and the start-up processing continues.

With respect to the locked SD memory card 21, data recorded on the SD memory card 21 can be used by unlocking the SD memory card 21 with a password (see steps R33 to R36 in FIG. 7).

By using this function, various data can be provided maintaining high secrecy and limiting the number of times the data can be used. In this case, much higher data protection is possible if data indicative of the maximum number of allowable uses is encrypted and stored in the protected area 213 in the SD memory card 21.

Described next will be a fifth embodiment of the present invention, which uses the lock function as described above. In the fifth embodiment, use of data recorded on the SD memory card 21 is allowed only within a preset control-expiration limit. The fifth embodiment will now be described with reference to FIGS. 1 and 10.

Figure 10:
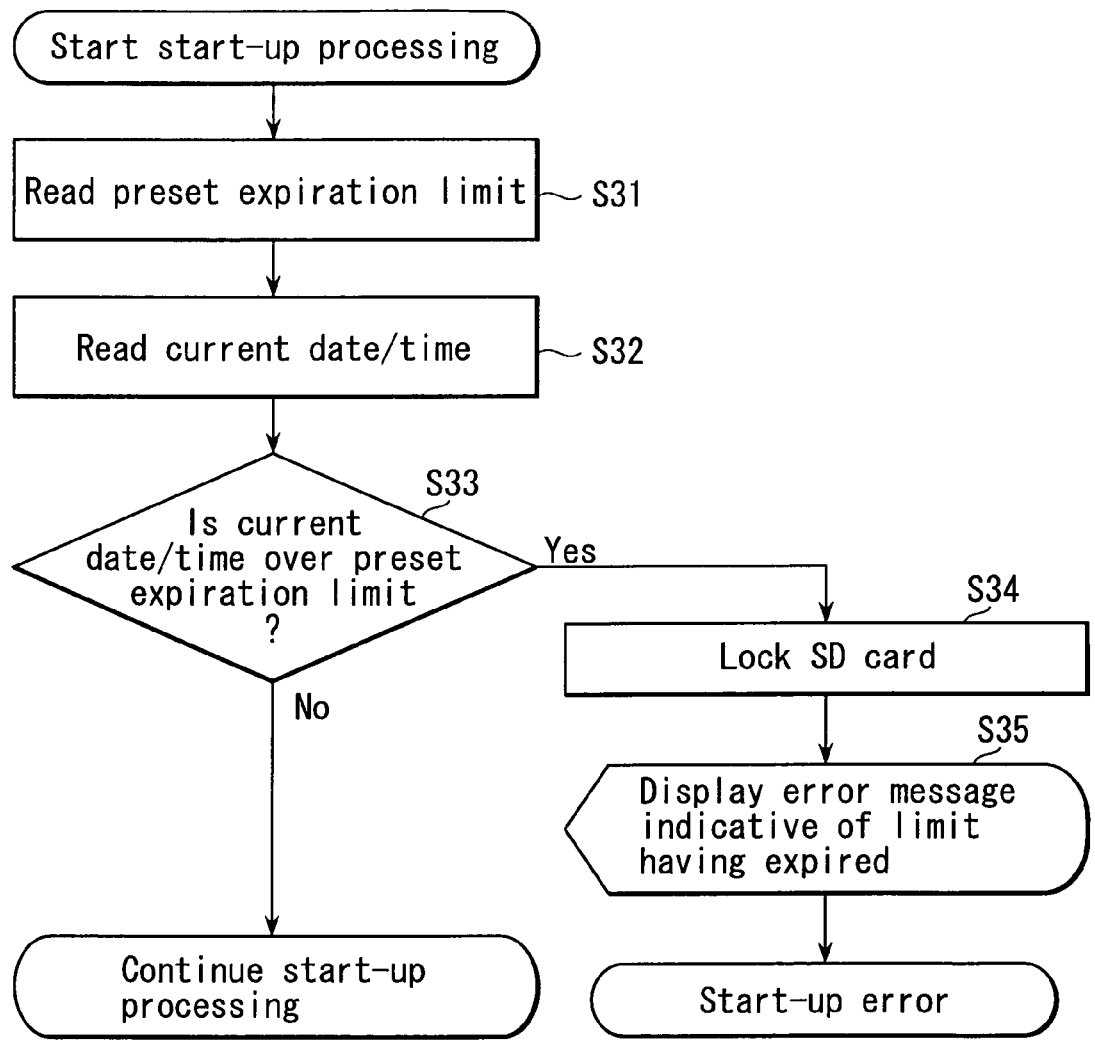
FIG. 10 is a flowchart showing the procedure of a start-up processing in a fifth embodiment of the present invention.

In the fifth embodiment shown in FIG. 10, data indicative of a preset control-expiration limit (step S31) is obtained as the access limit application program 121 starts up. Further, data indicative of the current date/time is obtained (step S32). Both of these data items are compared with each other to determine whether the current date/time is over the preset control-expiration limit or not (step S33). An example of obtaining each data item at this time has already been described in the third embodiment, and therefore, explanation of the example will be omitted.

If the current date/time is not over the preset control-expiration limit, i.e., within the control-expiration limit (No in step S33), the start-up processing is continued. If the current date/time is over the preset control-expiration limit, i.e., the control-expiration limit has expired (Yes in step S33), the SD memory card 21 is locked (step S34), and an error message thereof is displayed on the display device 18 (step S35). The access to the SD memory card 21 is then made invalid.

By using this function of controlling the usable period, various data can be provided maintaining high secrecy. In this case, much higher data protection is possible if data of the expiration limit of the usable period is encrypted and stored in the protected area 213 in the SD memory card 21.

Described next will be a sixth embodiment of the present invention, which uses the lock function described above. In the sixth embodiment, use of the data recorded on the SD memory card 21 is allowed up to a predetermined preset number of times. The sixth embodiment will be described with reference to FIGS. 1 and 11.

Figure 11:
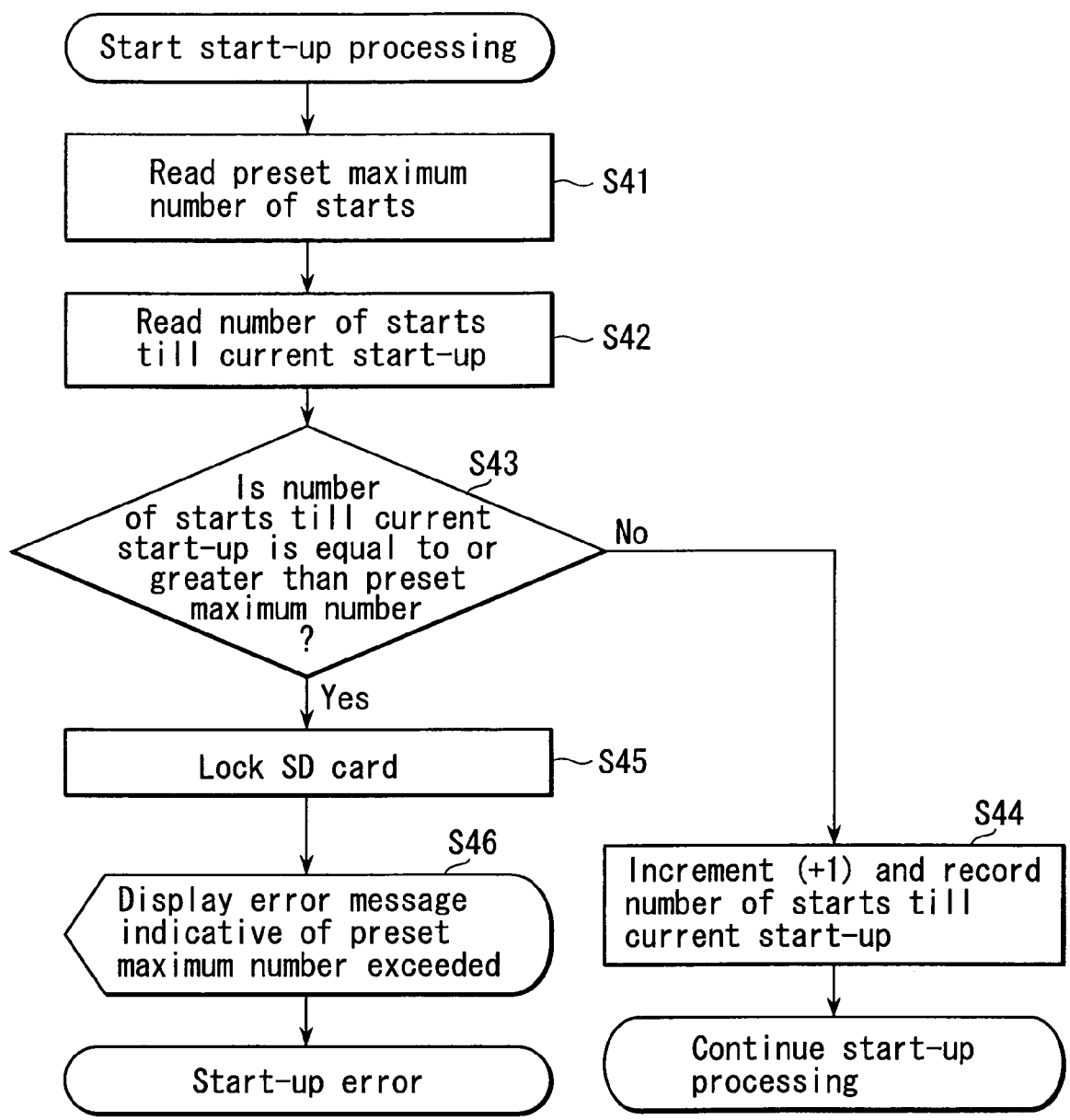
FIG. 11 is a flowchart showing the procedure of a start-up processing in a sixth embodiment of the present invention.

In the sixth embodiment, data indicative of a preset maximum number of allowable starts is obtained as the access limit application program 121 starts up (step S41 in FIG. 11). Further, data indicative of another number of starts, i.e., how many times the program 121 has been started up till the current start-up is obtained (step S42). Both of these data items are compared with each other to determine whether the number of starts till the current start-up exceeds the preset maximum number of allowable starts or not (step S43). An example of obtaining each data item at this time has already been described in the fourth embodiment, and therefore, explanation of the example will be omitted.

If the number of starts till the current start-up exceeds the preset maximum number of allowable starts (Yes in step S43), the SD memory card 21 is locked (step S45), and an error message indicating that the preset maximum number is exceeded is displayed on the display device 18 (step S46). Then, the access to the SD memory card 21 is made invalid.

If the number of starts till the current start-up does not exceed the preset maximum number of allowable starts, the number of starts till the current start-up is updated (+1) (step S44), and the start-up processing continues.

By using this function of limiting the number of uses, various data can be provided limiting the number of times the data can be used. In this case, much higher data protection is possible if data indicative of the maximum number of allowable uses is encrypted and stored in the protected area 213 in the SD memory card 21.

While the description above refers to particular embodiments of the present invention, it will be understood that many modifications may be made without departing from the spirit thereof. Though the above embodiments teaches that the SD card is unlocked based on one of time data, the number of accesses, and the accessing source, it is possible to modify the embodiments to unlock the SD card based on setting data including one of the time data, the number of accesses, and the accessing source. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A data processing apparatus comprising:
   a mount to which a recording medium having a lock/unlock function is attached;
   a determination unit which determines whether the recording medium attached to the mount has the lock/unlock function;
   a locking unit which locks the recording medium to protect data recorded on the recording medium; and
   an unlocking unit which unlocks the recording medium locked by the locking unit based on a predetermined condition.

2. The apparatus according to claim 1, wherein the unlocking unit unlocks the locked recording medium when a coincidence of a password is detected.

3. The apparatus according to claim 1, wherein the unlocking unit unlocks the locked recording medium according to a condition of a preset access limit.

4. The apparatus according to claim 3, wherein the access limit comprises one of time data, a number of accesses, and an accessing source, or setting data including the one.

5. The apparatus according to claim 1, further comprising an encryption unit which encrypts data to be recorded on the recording medium.

6. The apparatus according to claim 1, wherein the mount detachably attaches a card-like recording medium directly or via an adapter to a body of the apparatus.

7. The apparatus according to claim 6, wherein the recording medium comprises a first firmware program which performs a predetermined authentication procedure, a second firmware program which performs locking and unlocking, a protected area which is accessible when the authentication procedure is successfully completed, and a processor which performs processings of the first and second firmware programs, the processor being linked with the locking unit and the unlocking unit to perform the locking and the unlocking.

8. The apparatus according to claim 7, wherein data indicating the predetermined condition is recorded on the protected area, and the unlocking unit reads the data indicating the predetermined condition from the protected area.

* * * * *